(12) United States Patent
Wu et al.

(10) Patent No.: US 6,786,626 B2
(45) Date of Patent: Sep. 7, 2004

(54) LINEAR LIGHT SOURCE DEVICE FOR IMAGE READING

(75) Inventors: Rong Yaw Wu, Hsin-Tien (TW); Ming Jen Pang, Hsin-Tien (TW)

(73) Assignee: Pixon Technologies Corp., Taipei Hsien (TW)

( * ) Notice: Subject to any disclaimer, the term of this patent is extended or adjusted under 35 U.S.C. 154(b) by 126 days.

(21) Appl. No.: 10/141,126

(22) Filed: May 9, 2002

(65) Prior Publication Data

US 2003/0210556 A1 Nov. 13, 2003

(51) Int. Cl.$^7$ .............................. F21V 7/04; H01L 33/00
(52) U.S. Cl. ........................ 362/555; 362/31; 362/26; 362/27; 362/560; 362/243; 362/245; 362/328; 362/800
(58) Field of Search ............................ 362/555, 31, 26, 362/27, 551, 560, 243, 245, 328, 800

(56) References Cited

U.S. PATENT DOCUMENTS

| | | | | |
|---|---|---|---|---|
| 5,276,591 A | * | 1/1994 | Hegarty | 362/31 |
| 5,283,673 A | * | 2/1994 | Murase et al. | 349/65 |
| 6,357,903 B1 | * | 3/2002 | Furusawa et al. | 362/555 |
| 6,357,904 B1 | * | 3/2002 | Kawashima | 362/555 |
| 6,375,335 B1 | * | 4/2002 | Tabata et al. | 362/31 |
| 6,520,655 B2 | * | 2/2003 | Ohuchi | 362/31 |
| 6,545,732 B2 | * | 4/2003 | Nakano | 349/58 |
| 2001/0019480 A1 | * | 9/2001 | Fujino et al. | 362/31 |

FOREIGN PATENT DOCUMENTS

JP 61197437 A * 9/1986 ......... C03B/37/012

* cited by examiner

Primary Examiner—Stephen Husar
Assistant Examiner—Sharon Payne
(74) Attorney, Agent, or Firm—Rosenberg, Klein & Lee

(57) ABSTRACT

A linear light source device is provided having a main body that includes at least a light-guided bar and a light source assembly. The light-guided bar is a polygonal column with one striped surface forming, a reflective plane. The plane the opposite to reflective plane is a light-exiting plane having a convex profile, with the remaining planes being reflective planes. At least one of the ends of the polygonal column is an incident plane for a light beam to enter. The light beam is uniformly transmitted through the convex-shaped light-exiting plane.

15 Claims, 15 Drawing Sheets

LINEAR LIGHT SOURCE DEVICE FOR IMAGE READING

FIELD OF THE INVENTION

The invention relates to a linear light source device for image reading, such as a scanner, facsimile machine, multi-function office machine, and copy machine.

BACKGROUND OF THE INVENTION

The image reading device such as a scanner, facsimile machine, multi-function office machine, and copy machine etc. needs a linear light source to illuminate the targets. The method utilizes light emitting devices combined with a light-guided bar to guide the light into a linear light beam, thus illuminating the targets for image reading.

The current technology of the linear light source device for image reading are as follows: (1) utilize a cold cathode ray tube (CRT) for the linear light source 110 as shown in FIG. 1; (2) utilize a light-emitting diode (LED) array for the linear light source 120 as shown in FIG. 2; (3) utilize an LED array plus a prismatic lens for the linear light source 130 as shown in FIG. 3; (4) utilize a prismatic light-guided bar for the linear light source 140 as shown in FIG. 4; (5) utilize a prismatic light-guided bar plus housing for the linear light source 150 as shown in FIG. 5A and FIG. 5B; (6) utilize a light-guided bar for the linear light source 160, 170, 180, and 190 by a structure formed of the intersection of a prismatic column plane and an oblique plane as shown in FIG. 6, FIG. 7, FIG. 8A, FIG. 8B, FIG. 9A, and FIG. 9B.

The above-mentioned linear light source 110 shown in FIG. 1 is composed of a cold CRT 112 and a transfer circuit 114. The luminescence of the cold CRT 112 is the same as that of the fluorescent tube (hot CRT) except that it is suitable for small tube diameters since it has the merits of being simple in structure and having a compact electrode. But this technology needs to have a transfer circuit provided, the overall size is relatively large, and as the cold CRT 112 is a cylindrical type of luminaire, the rate of light energy utilization is low and it is unable to generate light with different wave lengths. Besides, it is fragile and has a short service life.

As shown in FIG. 2, several LEDs 124, such as forty pieces, are mounted on a substrate 122. The rate of light energy utilization is low since the space angle of the radiation can be greater than a half of a space. Moreover, since spaces existed between the LEDs, and since it is inconsistent in luminous intensity, the light uniformity is poor. Further, since many LEDs 124 are required, the cost is high.

As shown in FIG. 3, many LEDs 124, such as forty pieces, are mounted on a substrate 122. A prismatic lens 132 is also provided. In contrast with FIG. 2, although the addition of this prismatic lens 132 improves the rate of light energy utilization and light beam uniformity, the rate of light energy utilization is still low. Besides, it has the disadvantage of being high in cost.

Another conventional technology is shown in FIG. 4. The light is transmitted by the use of a prismatic light-guided bar 142 whose cross-section can be a circle, a rectangle, a triangle, an ellipse, or an irregular shape etc. The incident light 200 having an incident angle greater than the critical angle is transmitted into the light-guided bar 142 by total reflection without a loss in radiant flux, then goes through the light-guided bar 142 and exits out through the light-exiting plane to become exiting light beam 202. Light falling on the stripe 144 and having an incident angle smaller than the critical angle, refracts from the stripes 144 of the surface to become out-refracting light 204. In the meantime, in contrast with the surface with stripes, the light also falls on the smooth surface. Light beams having an incident angle smaller than the critical angle also refract from the smooth surface to become out-refracting light 206. Since the light-guided bar 142 is merely a simple prismatic column and the surface stripes 144 are in simple belt-shape, the light uniformity is poor.

Another technology is shown in FIG. 5A and FIG. 5B. A linear light source 150 is composed of a light-guided bar 152, a light source assembly 300, and a housing 158. The cross-section of the light-guided bar 152 consisting of the prismatic column is a pentagon by cutting a corner of a rectangle or a polygon by cutting two or more corners of a rectangle. The plane formed by cutting an angle is a light-exiting plane 154. The side surfaces other than the two neighboring side surfaces between the light-guided bar 152 and the light-exiting plane 154 are coated with reflective layers 156 (see FIG. 5B). A housing 158 is provided, separated by a thin air layer, between the light-exiting plane 154 and at least a plane other than an end plane of the two end planes provided by a light source assembly 300. This kind of technology increases the size of the device and the cost since the housing 158 is required. The device is apt to generate a light beam having an incident angle smaller than the critical angle. Moreover, the light beam reflected from the plane of the light-guided bar 152 allows only a portion to be reflected from the inner wall surface of the housing 158 and is then refracted back again into the light-guided bar 152, thereby, the rate of light energy utilization is not high. Further, since the device depends merely on the reflective layers 156 to adjust the output radiant flux distribution, the uniformity is inadequate.

Another technology is shown in FIG. 6 and FIG. 7. As shown in FIG. 6, a linear light source 160 is composed of a light-guided bar 162 and a light source assembly 300. The cross-section of the light-guided bar 162, constituted by the intersection of a prismatic column and an oblique plane, is a rectangle. Surface stripe 165 and reflective layers 166 are provided on an oblique surface 164 on the oblique plane, and the light-exiting plane is opposite to the oblique surface 164.

In FIG. 7, the linear light source 170 is composed of a light-guided bar 172 and two-end light source assemblies 300. As shown in FIG. 7, the light-guided bar 172 is constituted by the intersection of a prismatic column and an oblique plane. The cross-section of the prismatic column is a rectangle and the oblique plane has two oblique surfaces 174. A light-exiting plane 178 is provided opposite to the oblique surfaces 174. The remaining setups are the same as those in FIG. 6. Since the cross-sections of the light-guided bars 162 and 172 are rectangles, light beams having incident angles smaller than the critical angle are easily generated. As a result, there is a loss of radiant flux, and the rate of light energy utilization is poor. Besides, since the device depends on the linear variation of oblique planes 164, and 174 as well as the adjustment of the output radiant flux distribution, the light beam uniformity is poor.

In FIGS. 8A and 8B, a linear light source 180 is composed of a light-guided bar 182 and light source assemblies 300 positioned at both ends. The light-guided bar 182 is constituted by the intersection of a prismatic column and an oblique plane. The cross-section of the prismatic column is an irregular shape (see FIG. 8B). The oblique planes are constituted by two pairs of two oblique surfaces 184, of the light-guided bar 182, inclined in opposite directions. The light-exiting planes 186 are other prismatic column planes of non-cylindrical planes. The surface stripes 188 are on the opposite side of the light-exiting plane 186. Since the cross-section of the light-guided bar 182 is an irregular shape, light beams having incident angles smaller than the critical angle are easily generated. As a result, there is a loss of radiant flux, and the rate of light energy utilization is not high. Further, since the device depends on the linear-varied oblique surface 184 to adjust the output radiant flux distribution, the uniformity is inadequate.

In FIGS. 9A and 9B, a linear light source 190 is composed of a light-guided bar 192 and a light source assembly 300. The light-guided bar 192 is constituted by the intersection of a prismatic column and an oblique plane. The cross-section of the prismatic column is an irregular shape (see FIG. 9B). The oblique plane is an oblique curved surface, and the light-exiting plane 196 is an irregular prismatic column plane. The surface stripes 198 coated with a reflective layer are on the opposite side of the light-exiting plane 196. A groove 199 formed by two oblique surfaces is provided. Since the cross-section of the light-guided bar 192 is an irregular shape, light beams having an incident angle smaller than the critical angle are easily generated. As a result, there is a loss of radiant flux, and the rate of light energy utilization is poor. Further, since the reflective layers is a simple belt-shape and the device depends merely on the oblique curved surface 194 and groove 199 to adjust the output radiant flux distribution, the uniformity is inadequate.

Finally, another technology is shown in FIG. 10. As shown in FIG. 10, the surface stripe of the reflective plane of the light-guided bar is perpendicular to the light axis of the transmitting plane. They are in oblique-tooth shapes with unequal spaces, and the reflective layers appear in irregular shapes. The oblique teeth are inclined in a direction away from the light source assembly to facilitate transmitting the light of the reflecting light beam in a direction away from the light source assembly. Although the device has the merits of being compact in size, prominent in light uniformity, high in rate of light energy utilization, and able to change the length of the prismatic column, the manufacturing cost is rather high. This is due to the precise requirements for specification of the mold of the light-guided bar which are very rigorous in order to obtain the oblique-tooth shape having unequal spaces. Moreover, the fact that the device needs to be coated with a reflective layer results in high manufacturing cost. Consequently, the yield rate is poor making the manufacturing cost rather high.

SUMMARY OF THE INVENTION

An objective of the invention is to provide a linear light source device for image reading. The light-guided bar is simple in structure and configuration, thereby, the requirements for the precision specification are rational and not rigorous. As a result, the manufacturing cost for the mold is low. Moreover, the surface stripes of the reflective layers having surface stripes with reflective function are surface treated for surface roughness only. Reflecting paint is not required to be spread or coated. Therefore, the manufacturing yield of an ideal light-guided bar is easy to achieve.

Another objective of the invention is to provide a linear light source device for image reading wherein the length of the light-guided bar used can be cut to be shorter to become a relatively short light-guided bar.

Still another objective of the invention is to provide a linear light source device for image reading. The linear light source is illuminated by a point light source, or the point light source obtained through a transfer, which transmits through the light-guided bar to obtain a linear exiting light.

A still further objective of the invention is to provide a linear light source device for image reading. The linear light source can generate monochromatic light having different wavelengths, and can be combined into a linear light source with relatively long wavelength.

Yet another objective of the invention is to provide a linear light source device for image reading. The linear light source of the present invention is particularly applicable for an image reading device such as a scanner, facsimile machine, multi-function office machine, a copy machine, etc. that need a linear light source to illuminate targets.

To achieve the above mentioned objectives, the invention provides a linear light source including a light-guided bar and a light source assembly.

The light-guided bar includes a polygonal main body having at least a tail end plane for a light beam to enter; at least two planes in opposite locations of the main body to provide a reflective plane with surface stripes and a corresponding light-exiting plane, and the remaining planes constituting reflective layers with reflecting function so that the light beam transmitting into the incident plane and through the transmission of the polygonal main body as well as the multiple reflection of the reflective planes can transmit out of the light-exiting plane.

One of the surfaces of the polygonal main body appearing as a convex profile is a light-exiting plane that is not film-coated with white reflective paint while the corresponding reflective plane having surface stripes needs to be film-coated with white reflective paint. The stripes are treated by segmentation such that surface roughness is relatively smooth near the light source while the surface roughness is increased gradually as the stripes are located away from the light source according to the increase of the distance from the light source in order to make the light beam uniformly distributed so as to improve the uniformity of the light beam transmitting out of the light-exiting plane. The rest of the surfaces of the polygonal main body [@00be]ing reflective layers having reflective function can be film-coated with white reflective paint. Both the two tail end planes can be incident planes of the light beam. If a light beam transmits from the light source at both ends through the main body, then the two end planes are not coated with white reflective paint. But if a tail end of the two ends is an incident plane while the other tail end is a reflective plane, then the reflective end plane can reflect the light beam back to the polygonal main body, thereby, the reflective end plane needs to be coated with white reflective paint.

The light source assembly, which is connected to the incident end of the light-guided bar of a contact-type image sensor (CIS), is employed as the incident light source of the light-guided bar of the contact-type image sensor. The light source assembly includes a convex polygonal seat-type positioning plane, a reflective plane, and at least a light-emitting diode (LED) mounted on the mounting plane. The convex polygonal seat-type positioning plane is connected and tightly fitted to the incident tail end of the light-guided bar of the CIS where the light-guided bar is perpendicular to the mounting plane of the light source assembly.

The centerline, which is the light axis of the light source assembly, of the main body of the non-closed polygonal light-guided bar is perpendicular to the mounting plane. A non-closed convex polygonal main body constituting the positioning plane is tightly fitted to the incident end of the convex polygonal light-guided bar of the CIS and the other seat-type plane constituting the positioning plane contacts with the tail end plane of the incident end of the light-guided bar of the CIS.

Since the positioning plane intersect a non-closed convex type polygonal main body on a plane, and a non-closed convex polygonal main body constituting the positioning plane is tightly fitted to the incident end of the light-guided bar of the CIS, the other plane constituting the positioning plane contacts the end plane of the incident end of the light-guided bar of the CIS. Therefore, the invention possesses the characteristic of high precision on connecting positioning of the incident end of the light-guided bar of the CIS. Consequently, the leaking of the incident light source of the light-guided bar of the CIS is reduced to a minimum. As a result, the invention is superior in the consistency of the distribution of luminous intensity. What is more, at least one of the LEDs is mounted on the mounting plane so that the LED has a distance closest to the light axis and that the LED is uniformly distributed. Thereby, the luminous intensity is uniformly distributed and concentrated at the light axis. As a result, the rate of light energy utilization and the light beam uniformity of the light-guided bar of the CIS is substantially improved.

Since all one has to do is to have the incident end of the light-guided bar of the CIS directly plugged in, that is to rely on the tight fitting between a non-closed polygonal main body constituting the positioning plane and the incident end of the light-guided bar of the CIS, the connecting work is accomplished without using the conventional art of a molten rivet connection. Therefore, the invention can simplify the art of connecting, and thereby, lower the production cost.

In order to further understand the objectives, characteristics, and the efficacy of the invention, a detailed illustration with accompanied drawings is performed as follows:

DETAILED DESCRIPTION OF THE EMBODIMENTS

Figure 1:
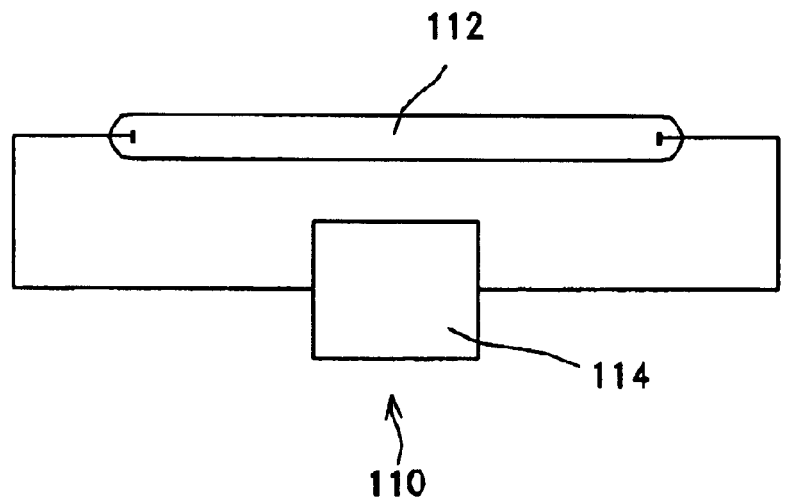
FIG. 1 is a schematic plan view of a cold CRT employed by the linear light source of the prior art.
Figure 2:
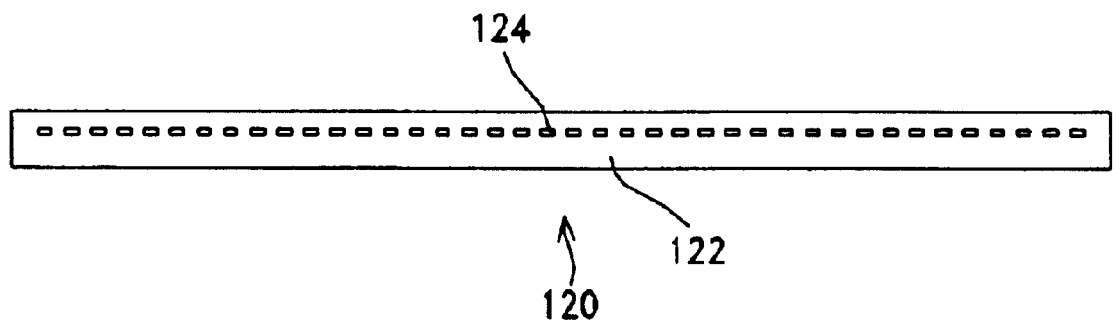
FIG. 2 is a schematic plan view of an LED array employed by the linear light source of the prior art.
Figure 3:
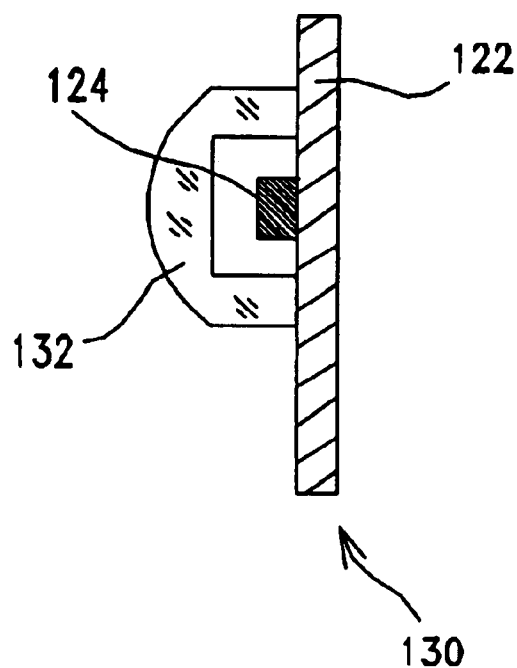
FIG. 3 is a schematic cross-sectional view of an LED array plus a prismatic column plane employed by the linear light source of the prior art.
Figure 4:
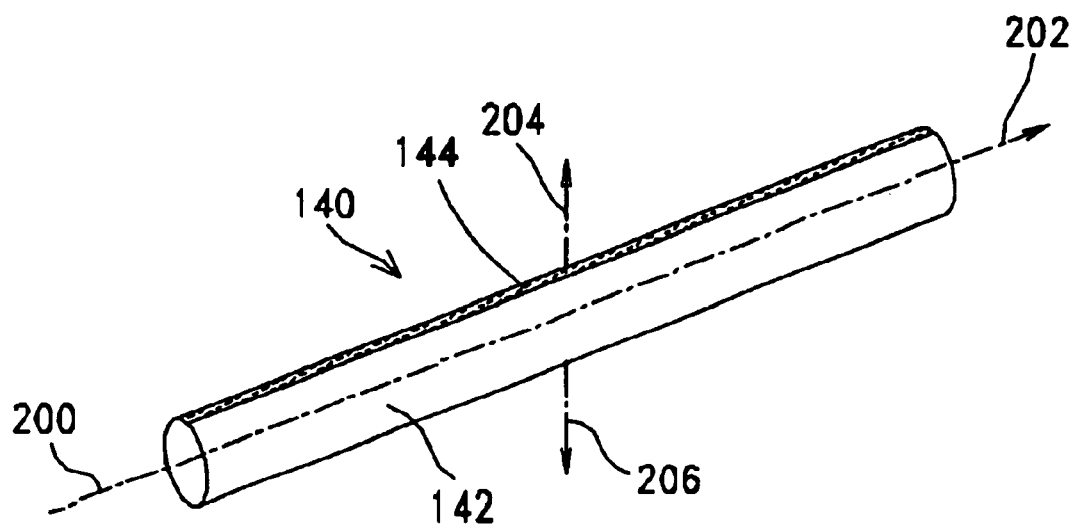
FIG. 4 is a schematic isometric view of a prismatic light-guided bar employed by the linear light source of the prior art.
Figure 5A:
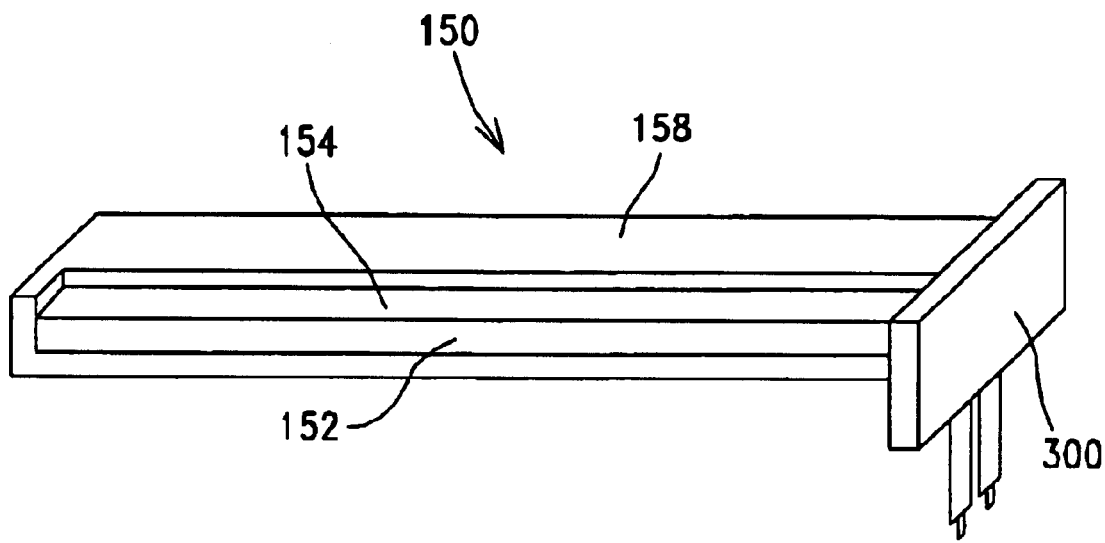
FIG. 5A is a schematic isometric view of a prismatic light-guided bar plus a housing employed by the linear light source of the prior art.
Figure 5B:
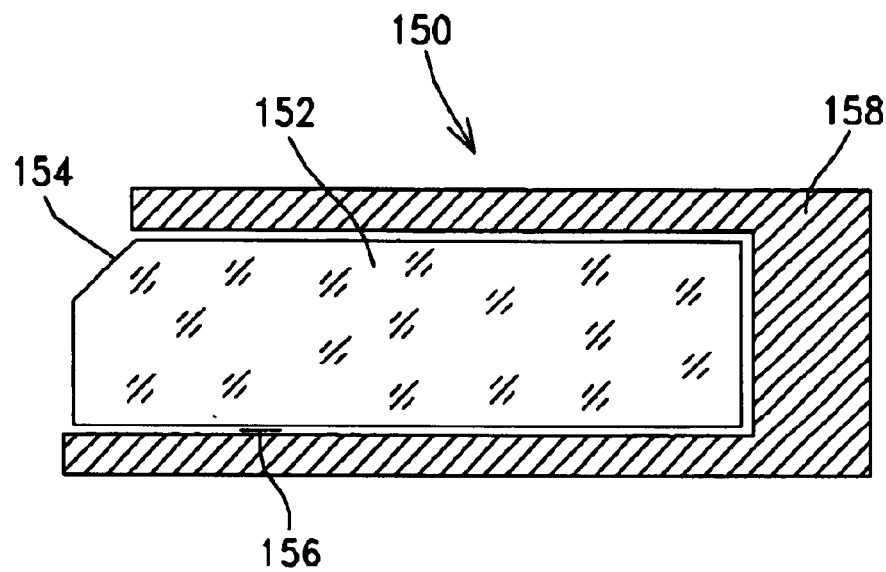
FIG. 5B is a schematic cross-sectional view of FIG. 5A.
Figure 6:
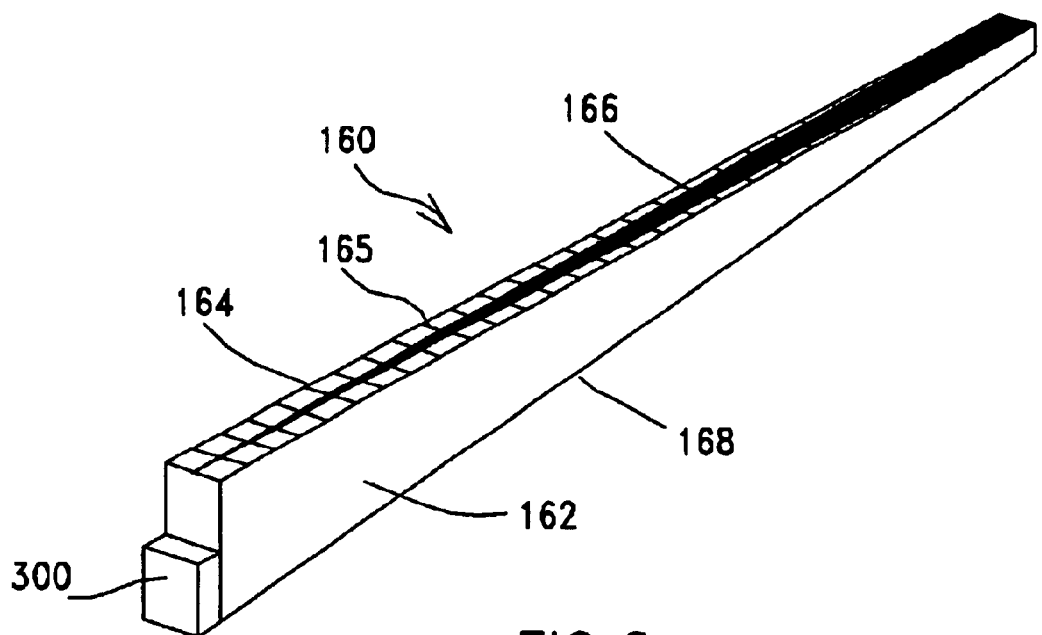
FIG. 6 is a schematic isometric view of a light-guided bar, constituted by the intersection of a prismatic column plane and an oblique plane, employed by the linear light source of the prior art.
Figure 7:
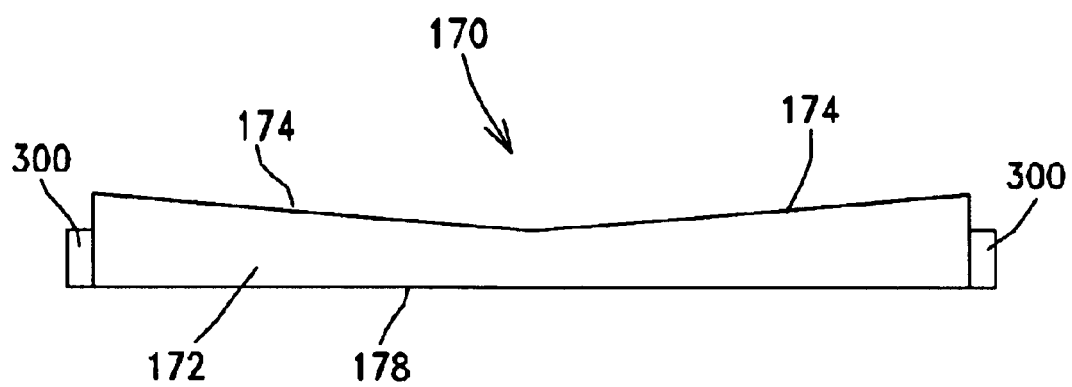
FIG. 7 is a schematic plan view of a light-guided bar, constituted by the intersection of a prismatic column plane and an oblique plane, employed by another linear light source of the prior art.
Figure 8A:
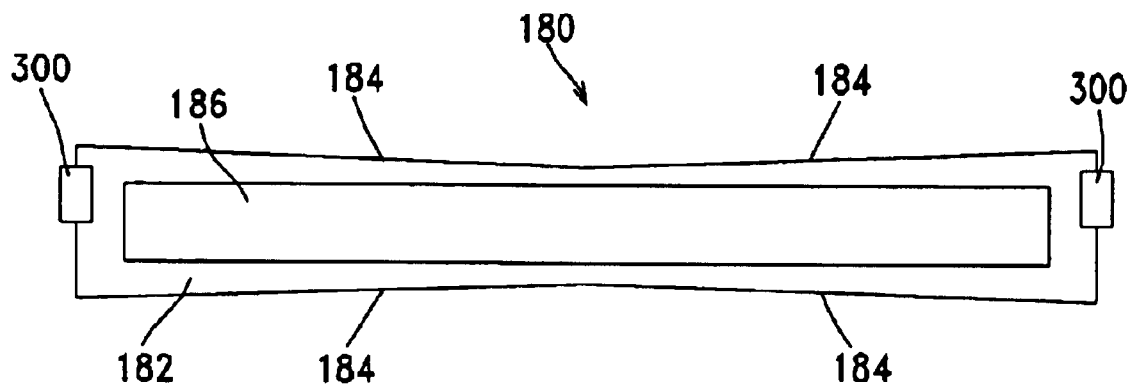
FIG. 8A is a schematic plan view of a light-guided bar, constituted by the intersection of a prismatic column plane and an oblique plane, employed by the linear light source of the prior art.
Figure 8B:
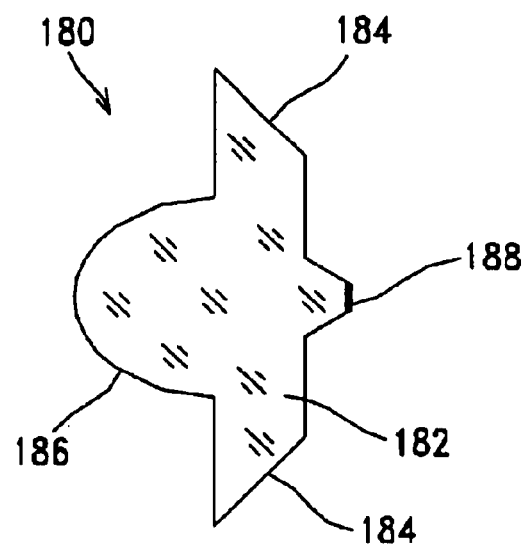
FIG. 8B is a schematic cross-section view of FIG. 8A.
Figure 9A:
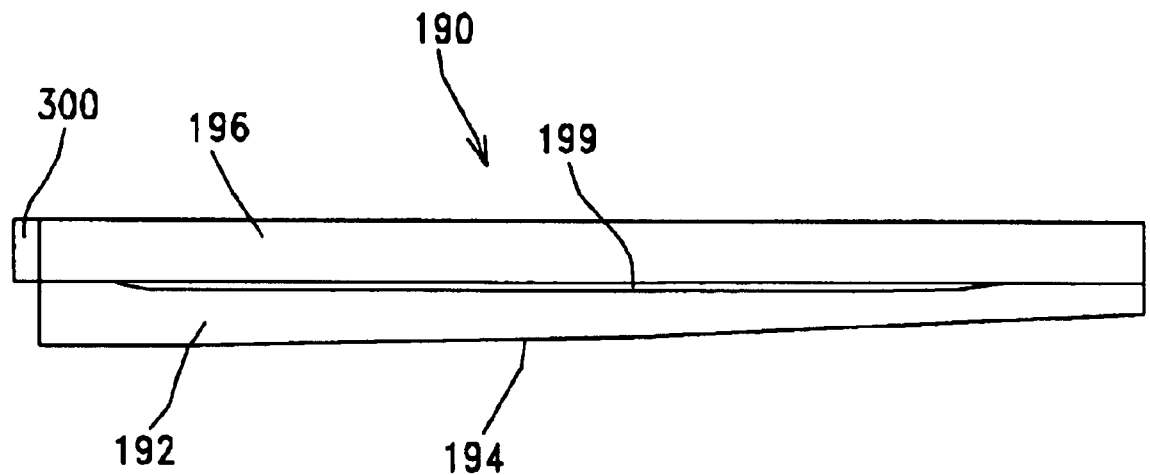
FIG. 9A is a schematic plan view of a light-guided bar, constituted by the intersection of a prismatic column plane and an oblique plane, employed by the linear light source of the prior art.
Figure 9B:
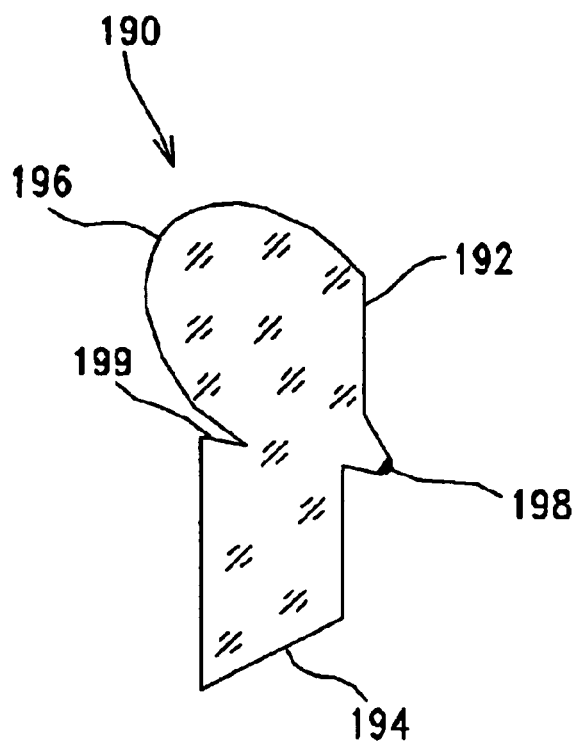
FIG. 9B is a schematic cross-sectional view of FIG. 9A.
Figure 10:
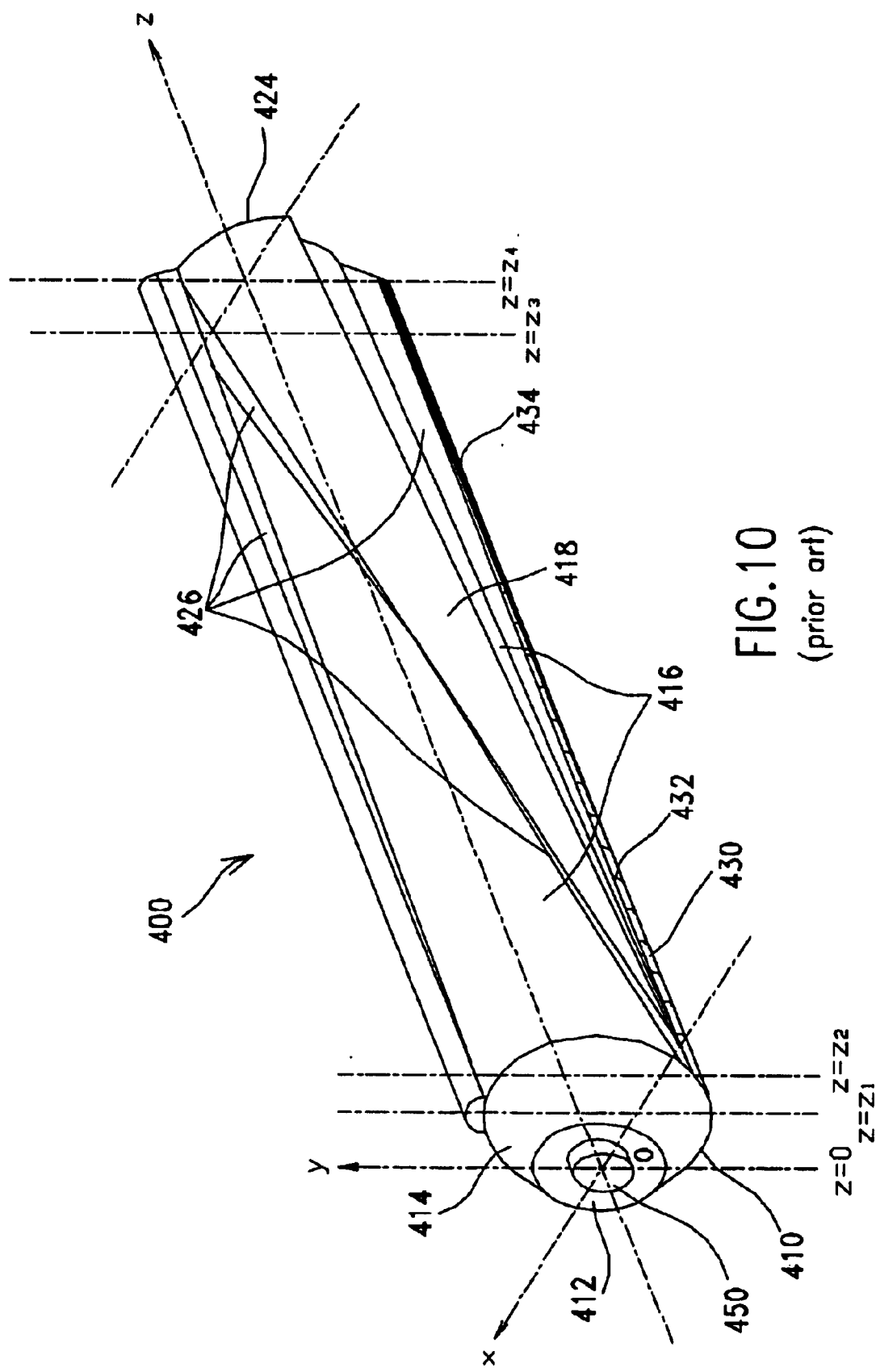
FIG. 10 is a schematic isometric view of the linear light source of the prior art.
Figure 11:
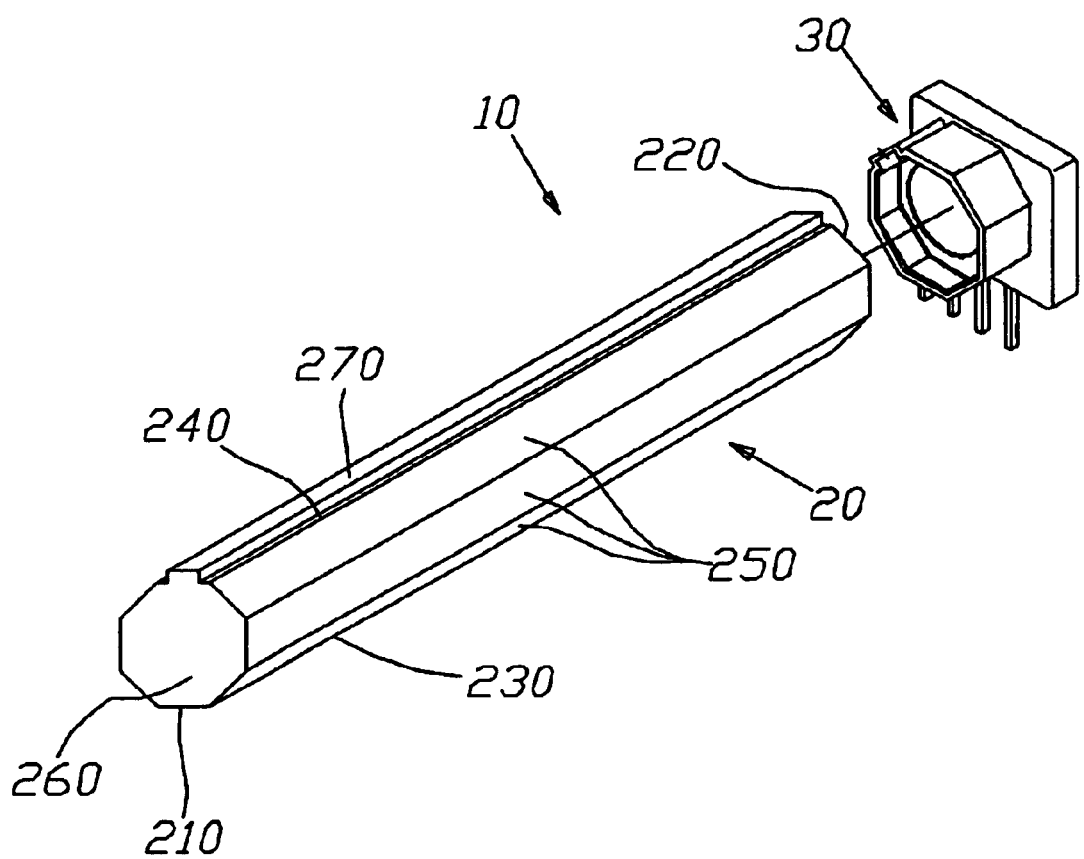
FIG. 11 is an isometric view of the structure of a light-guided bar according to an embodiment of the present invention.

FIG. 11 is an isometric view of a preferred embodiment of the invention. As shown in FIG. 11, the linear light source 10 of the invention comprises a light-guided bar 20 and light source assembly 30. Essentially, the light-guided bar 20 is an octagonal polygonal main body, and being a symmetrical octagonal column 210, it is selected as a preferred embodiment of the invention. The symmetrical octagonal column 210 includes: an incident plane 220 having at least an end face into which the light beam is allowed to enter while the other end face can be a tail end face 260; a reflective plane 230; a light-exiting plane 240; and a reflective layer 250. A long strip of protuberance 270 is provided on a side surface of the symmetrical octagonal column 210 and is used as the light-exiting plane 240. The reflective plane 230 and the light-exiting plane 240 are provided respectively on the side surfaces of the symmetrical octagonal column 210 and both are opposite to each other. The remaining side surfaces are all for reflective layers 250. The reflective layers 250 are composed of a multiplicity of rectangular planes with their light axes at angles to both of the reflective plane 230 and light-exiting plane 240. The reflective layers 250 are connected to the reflective plane 230 and light-exiting plane 240 respectively. Moreover, material used for the symmetrical octagonal column 210 is an optical material with high transmittance and low absorption characteristic such as acrylic-plastic sheets. Preferably, the surface roughness and the refractive index of the light-guided bar 20 is as low as possible as it makes the incident angle of the incident light beam greater than critical angle so that total reflection can be achieved and the radiant flux loss is reduced.

Figure 12A:
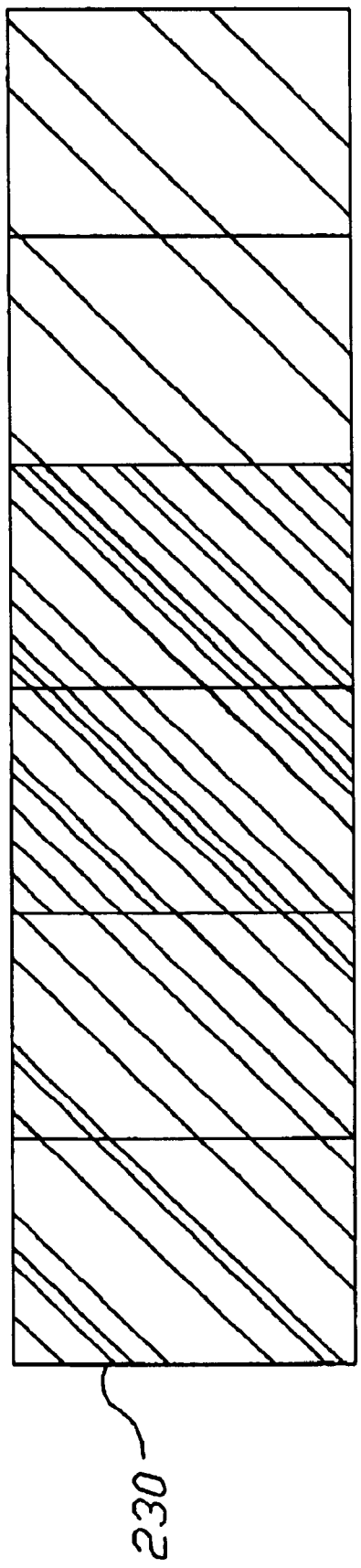
FIG. 12A is a schematic cross-sectional view of the structure of the light-guided bar according to an embodiment of the present invention.
Figure 12B:
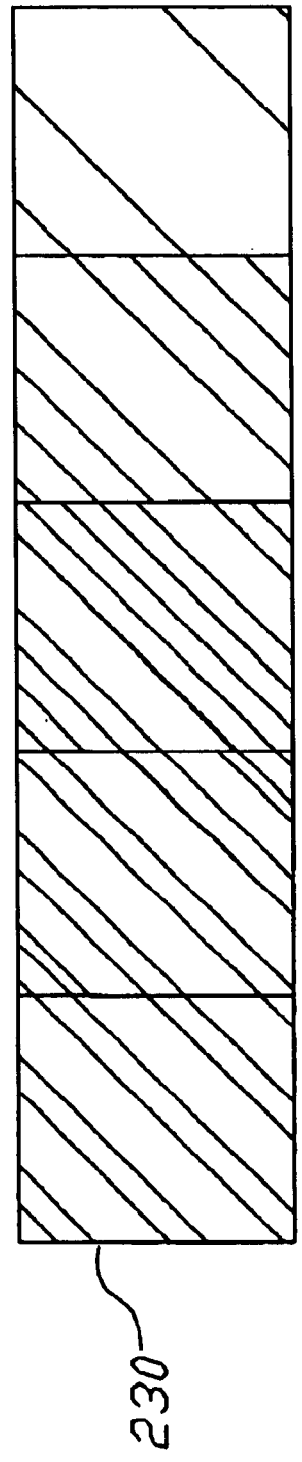
FIG. 12B is another schematic cross-sectional view of the structure of the light-guided bar according to an embodiment of the present invention.

A surface treatment can be performed for the inner surface of the reflective plane 230. FIG. 12A and FIG. 12B are schematic cross-sectional views of the light-guided bar 20 of the invention. As shown in FIG. 12A and FIG. 12B, the types of surface stripe can be classified into two types. One of them is that the surface roughness is higher far away from the light source and is lower near the light source. The other one of them is treated by segmentation so that each segment has different surface roughness in order to increase or decrease the coefficients of reflection, refraction, and absorption. A surface having relatively high surface roughness is high in scattering ability and large in reflective angle. Conversely, a surface having relatively low surface roughness is low in scattering ability and small in reflective angle and, in the meantime, can change its radiant flux. Similarly, one can decrease or increase the area of the surface stripe by changing the length of the symmetrical octagonal column 210 in order to adjust the magnitude of the radiant flux to improve the uniformity of the light beam. The light-exiting plane 240 is provided relatively to the reflective plane 230. The reflective layers 250 are composed of a multiplicity of rectangular planes that can connect to both of the reflective plane 230 and light-exiting plane 240. In addition, the light axes, i.e. the X-axis of each of the transmitting planes, are at angles to both of the reflective plane 230 and light-exiting plane 240.

Figure 13:
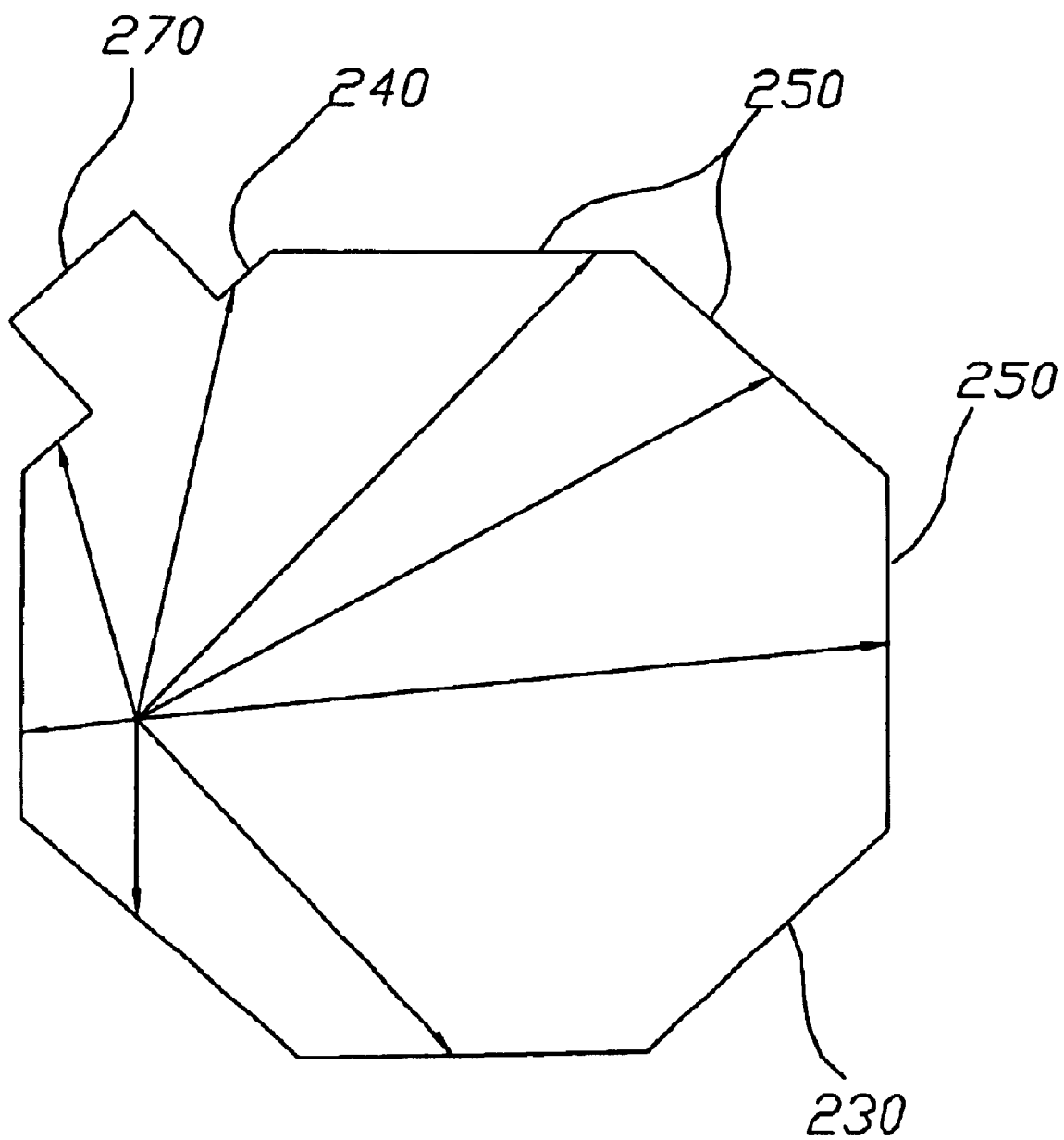
FIG. 13 is the light beam path according to an embodiment of the present invention.
Figure 14:
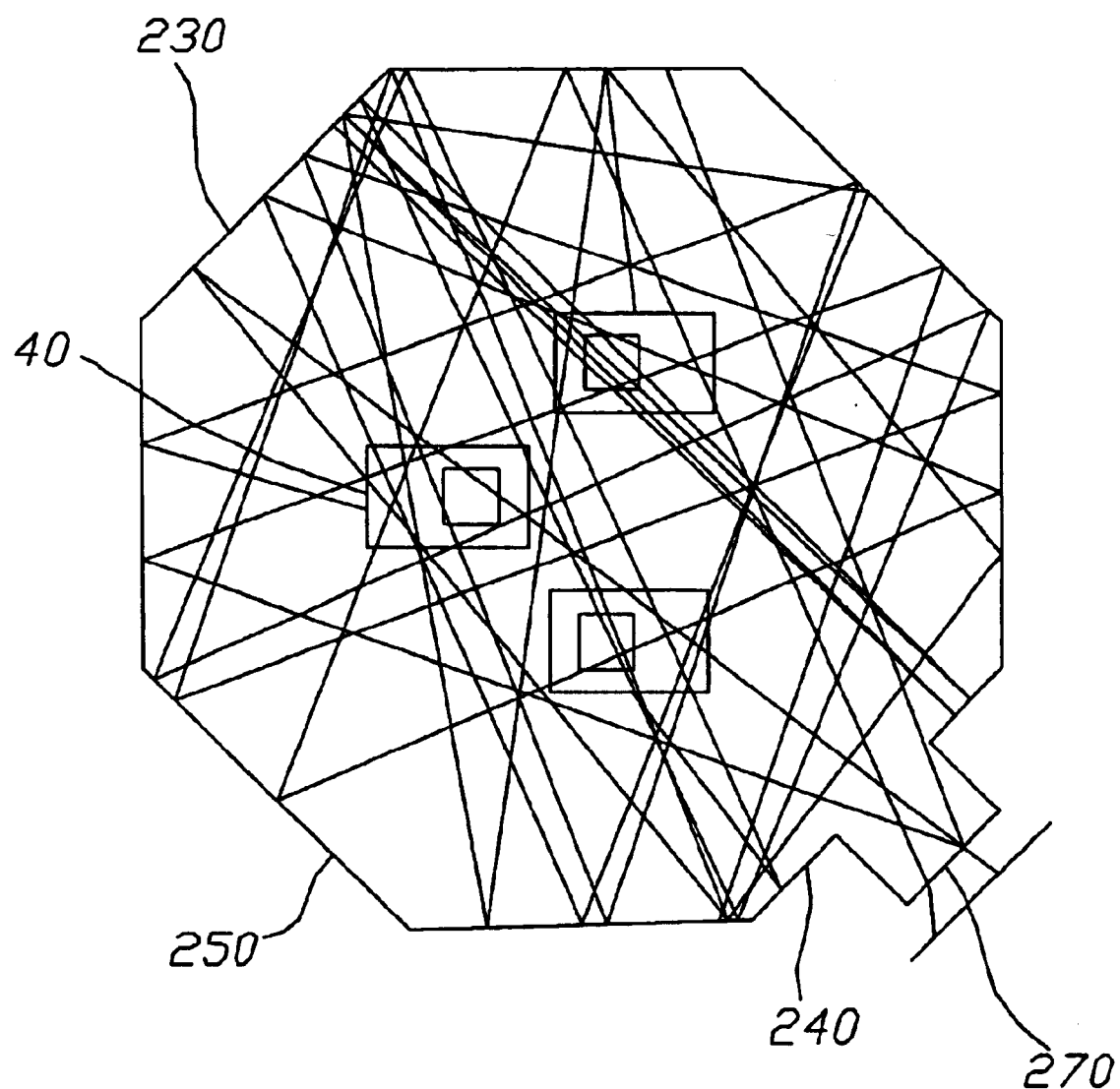
FIG. 14 is another light beam path according to an embodiment of the present invention.

FIG. 13 and FIG. 14 are the light beam paths of the invention. As shown in FIG. 13 and FIG. 14, the light beam entering the incident plane 220 through a multiplicity of reflection of the a plurality of reflective layers 250 so as to improve the light beam uniformity by concentrating the light beam to the reflective plane 230. It then transmits toward the light-exiting plane 240 through the reflection of the reflective plane 230. The light beam uniformity is improved substantially since a surface treatment is performed on the surface of the reflective plane 230. The tail end face 260 at the other end of the symmetrical octagonal column 210 is coated with white or silver color of light-reflective paint by the film-coating method. Thereby, the light can be reflected once more back to the symmetrical octagonal column 210 to further improve the utilization of light energy. Similarly, the incident plane 220, reflective plane 230, and the plurality of light-exiting plane 240 can also be coated with white or silver color of light-reflective paint to facilitate the improvement of utilization of light energy and the index of reflection. It can further reduce the possibility of being absorbed by the material and lower the index of absorption.

Figure 15:
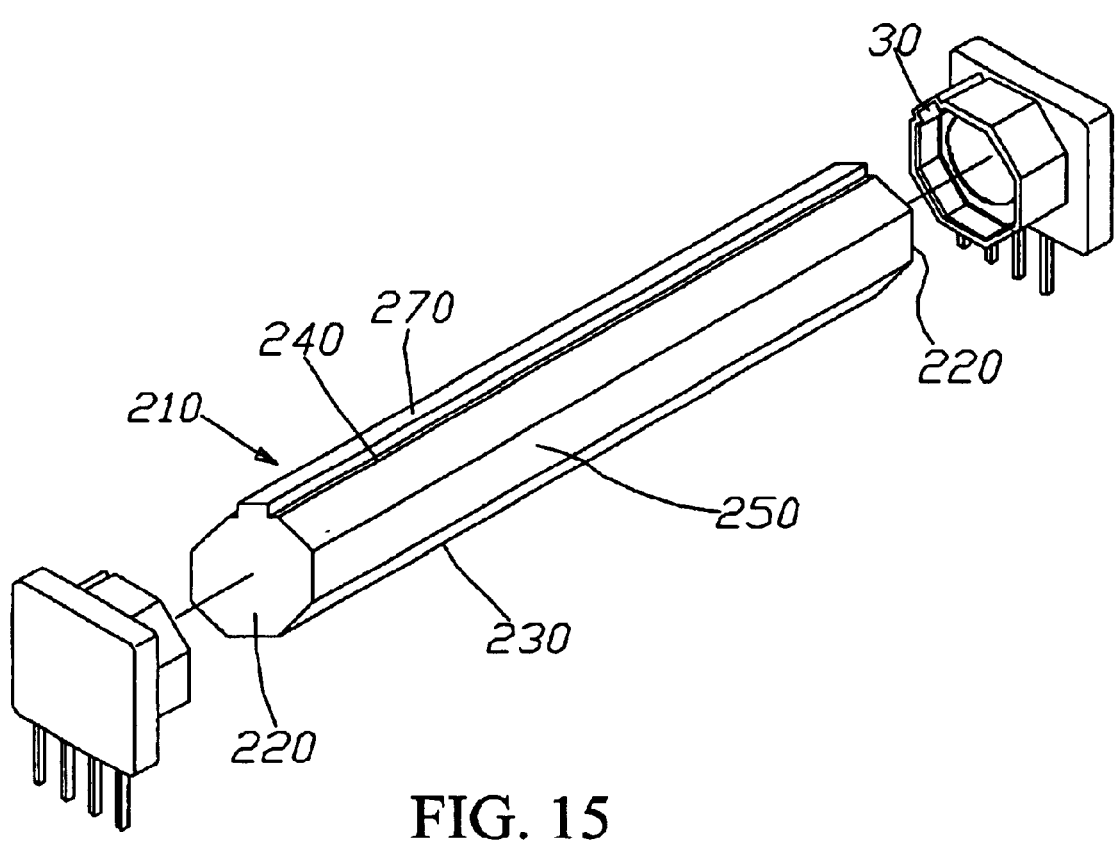
FIG. 15 is an isometric view of a light source assembly according to an embodiment of the present invention.

FIG. 15 is an isometric view of light source assembly of an embodiment of the invention. As shown in FIG. 15, the other end of the symmetrical octagonal column 210 can also be an incident plane 220 for the light beam so that both end of the symmetrical octagonal column 210 can allow the entering of the light beam.

Figure 16:
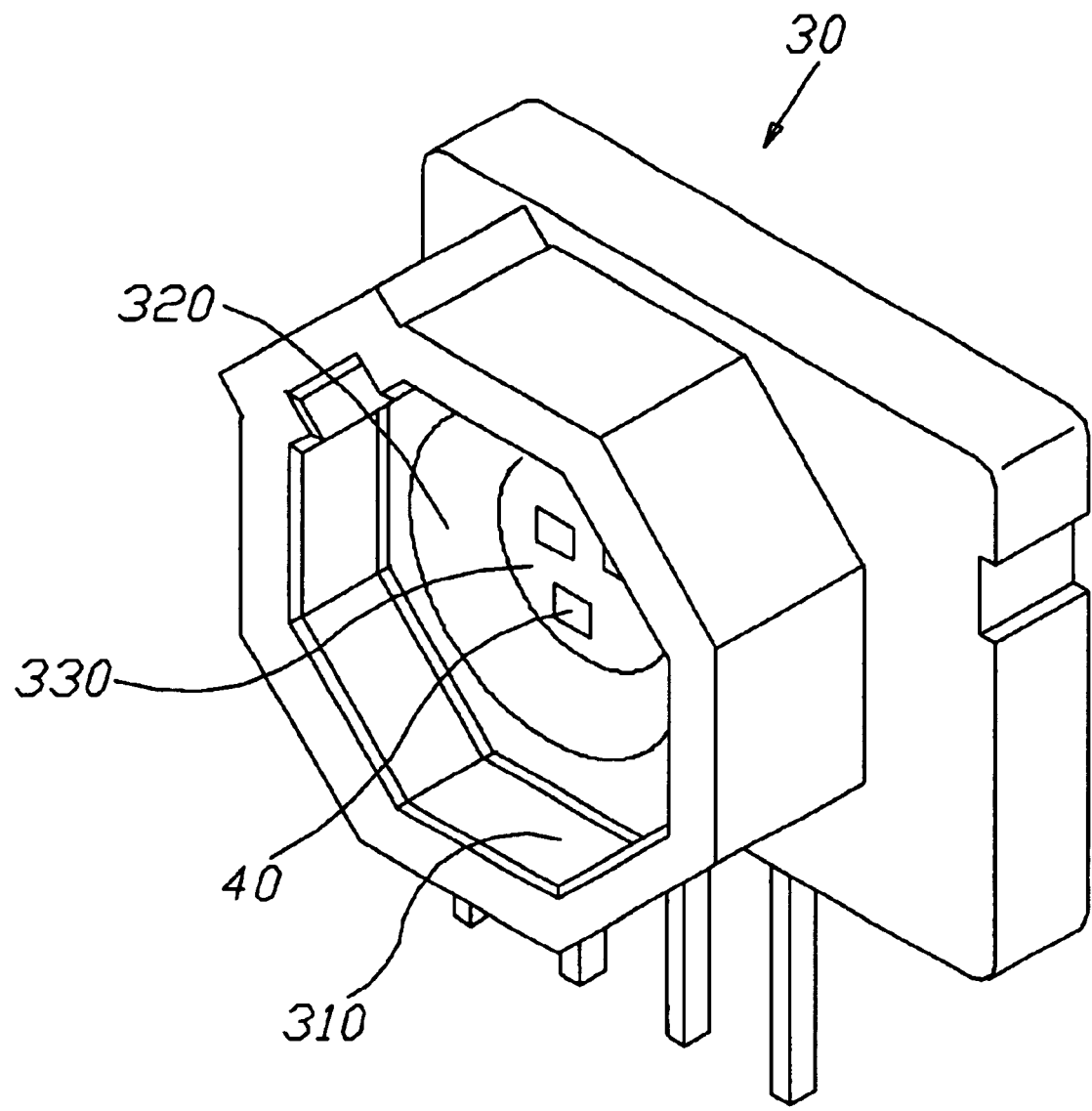
FIG. 16 is an isometric view of a light source assembly according to an embodiment of the present invention.

FIG. 16 is an isometric view of light source assembly of another embodiment of the invention. As shown in FIG. 16, the light beam assembly 30 includes a mounting plane 310, a positioning plane 320, and a reflective end plane 330 where the mounting plane 310 has the same profile as that of the symmetrical octagonal column 210. Additionally, at least a mounting location is needed for an LED 40.

Figure 17A:
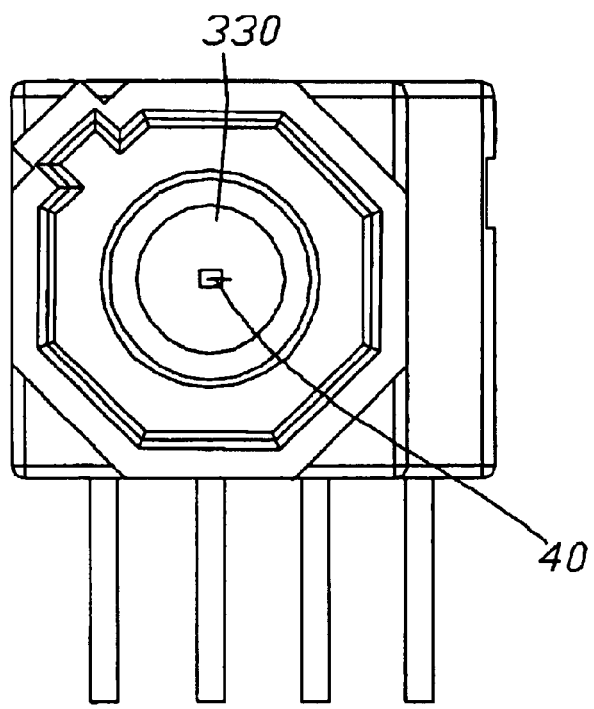
FIG. 17A is a schematic mounting diagram of the light-emitting diodes (LED) according to an embodiment of the present invention.
Figure 17B:
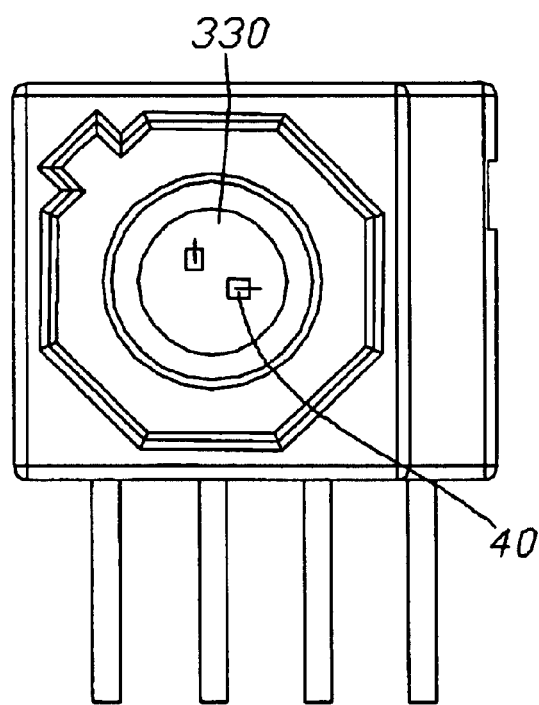
FIG. 17B is a schematic mounting diagram of the light-emitting diodes (LED) according to an embodiment of the present invention.
Figure 17C:
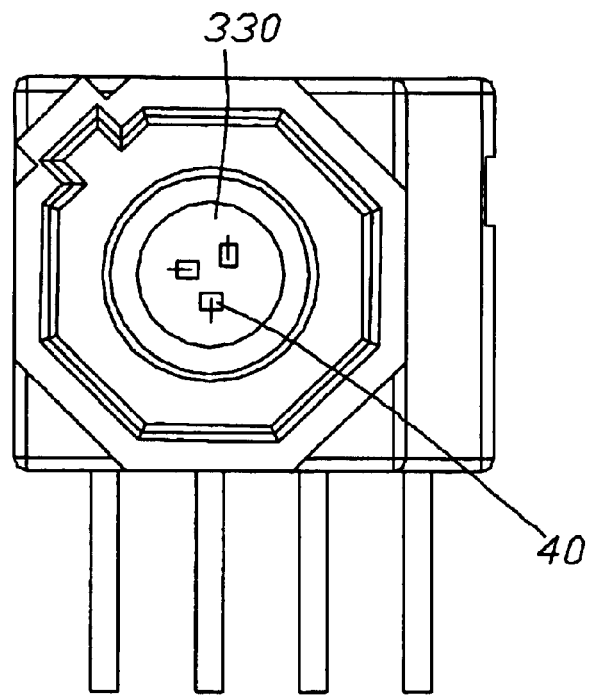
FIG. 17C is a schematic mounting diagram of the light-emitting diodes (LED) according to an embodiment of the present invention.
Figure 17D:
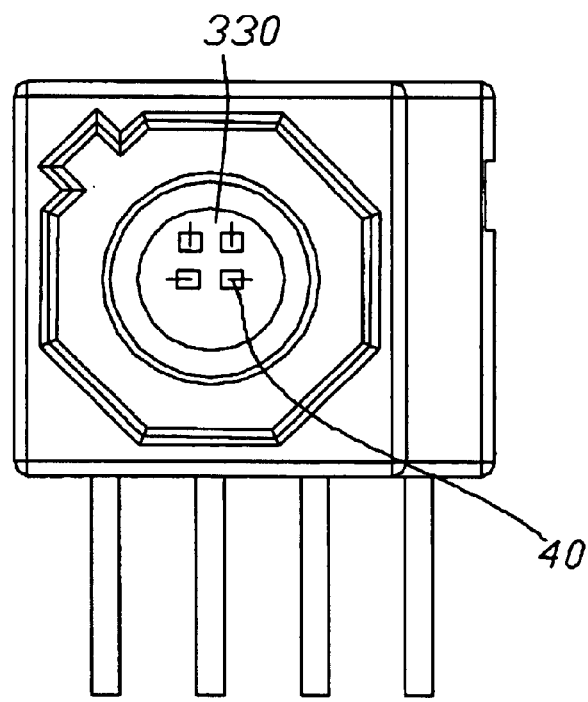
FIG. 17D is a schematic mounting diagram of the light-emitting diodes (LED) according to an embodiment of the present invention.

FIG. 17A through FIG. 17D are schematic mounting diagrams of the light-emitting diodes (LED) of varied embodiments of the invention. As shown in FIG. 17a, an LED 40 is mounted at the center of the reflective end plane 330. As shown in FIG. 17B, two LEDs 40 are positioned in the center of the reflective end plane 330, and preferably, the center distance of the two LEDs is as small as possible. As shown in FIG. 17C, the centers of the three LEDs 40 fall within a circle which is preferably as small as possible. The center of the circle coincides with the center of the reflective end plane 330. As shown in FIG. 17d, the centers of the four LEDs 40 fall within a circle which is preferably as small as possible and the center of the circle coincides with the center of the reflective end plane 330. In addition, the four adjacent connecting lines connecting successively between the centerlines of the LEDs form a square. As a result, according to the aforementioned illustrations, since the LEDs are mounted on the reflective end plane 330 with their distances that are as close as possible to the light axis and the disposition is uniformly distributed, the luminous intensity of the light beam assembly can concentrate further to the light axis.

While the invention has been described by way of examples and in terms of a preferred embodiments, it is to be understood that the invention is not limited to the disclosed embodiment. On the contrary, it is intended to cover various modifications. Therefore, the scope of the appended claims should be accorded the broadest interpretation so as to encompass all such modifications.

What is claimed is:

1. A linear light source device comprising:
    a light source assembly comprising a non-closed mounting plane, at least a reflective end plane; at least a positioning plane, and at least a light-emitting diode (LED) mounted on the reflective end plane; and
    a light-guided bar including a polygonal column, at least a light-exiting plane, a reflective plane, and a plurality of reflective layers and further including at least a tail end plane of said light-guided bar being an incident plane for light beam to enter, wherein at least two planes in opposite locations of said light-guided bar being the reflective plane with surface stripes and a corresponding light-exiting plane, and the other planes being reflective layers with reflecting function so that the light beam transmitting into the incident plane and through the transmission of the polygonal main body as well as the multiple reflection of the reflective planes can transmit out of the light-exiting plane with relatively uniform light beam.

2. The linear light source device of claim 1, wherein said mounting plane of said light source assembly is an octagonal plane.

3. The linear light source device of claim 1, wherein said polygonal column of said light-guide bar is an octagonal column.

4. The linear light source device of claim 1, wherein a centerline of said non-closed polygonal mounting plane of said light source assembly is perpendicular to the positioning plane and it is a light axis of the light source assembly.

5. The linear light source device of claim 1, wherein said non-closed polygonal mounting plane of the light source assembly is tightly fit to the incident plane of the light-guided bar.

6. The linear light source device of claim 1, wherein a plane constituting the positioning plane of the light source assembly contacts with an end plane of the light-guided bar.

7. The linear light source device of claim 1, wherein a centerline of the polygonal reflective end plane of the light source assembly coincides with the light axis of light beam assembly.

8. The linear light source device of claim 1, wherein said at least one of the light-emitting diodes of the light source assembly is mounted on the reflective end plane by the way that it is the closest to the light source assembly and is uniformly distributed.

9. The linear light source device of claim 1, wherein said light-exiting plane on the light-guided bar structure further comprises a protruding profile.

10. The linear light source device of claim 7, wherein said light-exiting plane is in a long strip profile whose area can be selected in accordance with application so as to achieve an ideal luminous intensity.

11. The linear light source device of claim 1, wherein said reflective plane has stripes on its surface, and the stripes are treated by segmentation so that each segment has different surface roughness.

12. The linear light source device of claim 1, wherein said reflective plane of the polygonal column has stripes on its surface, and the stripes are treated by segmentation such that surface roughness is relatively smooth near the light source assembly while the surface roughness increases gradually as the stripes are away from the light source assembly according to the increase of the distance from the light source assembly in order to make the light beam uniformly distributed so as to improve the uniformity of the light beam transmitting out of the light-exiting plane.

13. The linear light source device of claim 1, wherein a surface of the reflective plane of the polygonal column is film-coated by silver-white, light-reflective paint.

14. The linear light source device of claim 1, wherein an other end plane of the polygonal column is a second tail end plane for reflecting the light beam, that is incident to the plane, back to the main body.

15. The linear light source device of claim 1, wherein a surface of the second tail end plane of said light-guided bar is film-coated by silver-white, light-reflective paint.

* * * * *